Dec. 11, 1962 H. NORTON ET AL 3,067,624
PUMPS, COMPRESSORS AND ENGINES
Filed April 11, 1960 2 Sheets-Sheet 1

INVENTORS
HENRY NORTON
HUBERT V. NORTON
LESLIE B. NORTON
DOUGLAS E NORTON
BY
Watson, Cole, Grindle + Watson
ATTORNEYS Dec. 11, 1962     H. NORTON ET AL     3,067,624
PUMPS, COMPRESSORS AND ENGINES Filed April 11, 1960     2 Sheets-Sheet 2

INVENTORS
HENRY NORTON
HUBERT V. NORTON
LESLIE B. NORTON
DOUGLAS E NORTON

BY
Watson, Cole, Grindle + Watson
ATTORNEY

United States Patent Office 3,067,624
Patented Dec. 11, 1962

3,067,624
PUMPS, COMPRESSORS AND ENGINES
Henry Norton, Hubert Veare Norton, Leslie Buckingham Norton, and Douglas Edwin Norton, all of Horley, England, assignors to Norton Tool Company Limited, Surrey, England, a company of Great Britain
Filed Apr. 11, 1960, Ser. No. 21,403
Claims priority, application Great Britain Apr. 16, 1959
3 Claims. (Cl. 74—50)

This invention relates to pumps, compressors or motors (hereinafter referred to generically as machines) of the kind having a shaft and at least one reciprocating piston driving or driven by the shaft.

It is an object of the invention to provide such a machine in which motion is transmitted from the piston to the shaft, or vice versa, by means of an eccentric, and in which relative lateral movements between the eccentric and the piston take place with a minimum of friction.

According to the present invention a machine as above defined comprises a shaft, at least one reciprocating piston driving or driven by the shaft, an eccentric which rotates with the shaft and which has a circular periphery the central axis of which is parallel with, but eccentric to, the axis of rotation of the shaft, and a ring surrounding the eccentric and within which the eccentric can rotate, the ring having at least one outwardly facing chordal surface and the piston having an inwardly facing end surface which is parallel to the chordal surface and perpendicular to the axis of reciprocation of the piston and which is separated from the chordal surface by balls or rollers which can roll on both surfaces.

The lateral length of the said surfaces should be sufficient to permit rolling of the balls or rollers through a distance at least equal to the throw of the eccentric. The balls or rollers will then be able to roll freely throughout the full range of relative lateral movement between the ring and the piston.

The arrangement of balls or rollers between the piston and the ring provides an efficient method of transferring pressures between the ring and the piston, which of necessity are subjected to relative lateral movement owing to the eccentricity of the ring, with a minimum of wear and with low frictional losses; the invention is therefore particularly applicable to high pressure liquid pumps or liquid-operated motors.

The invention is particularly advantageous in multi-piston machines having three or more pistons distributed radially at intervals around the axis of rotation of the shaft, since in such a machine at least a part of the inevitable relative lateral movement between the ring and each piston usually takes place while the piston is under load.

In one form of the invention the said inwardly-facing surface of the piston is the base of a groove which accommodates the said balls or rollers, the sides of the grooves overlapping the sides of the ring. The groove may thus serve to guide the balls or rollers, and the overlapping of its sides with the sides of the ring ensures that the said flat surfaces remain in the correct alignment.

The return stroke of the piston may be performed by means of a spring.

The invention may be performed in various ways, and a specific embodiment, with modifications, will now be described by way of example with reference to the accompanying drawings, in which.

Figure 1:
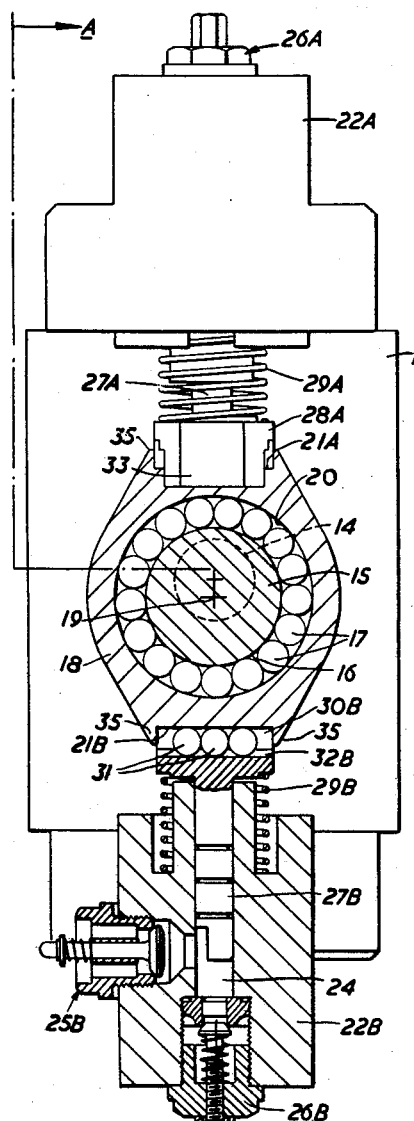
FIGURE 1 is an end elevation, partly in section, of a two-cylinder hydraulic pump embodying the invention.
Figure 2:
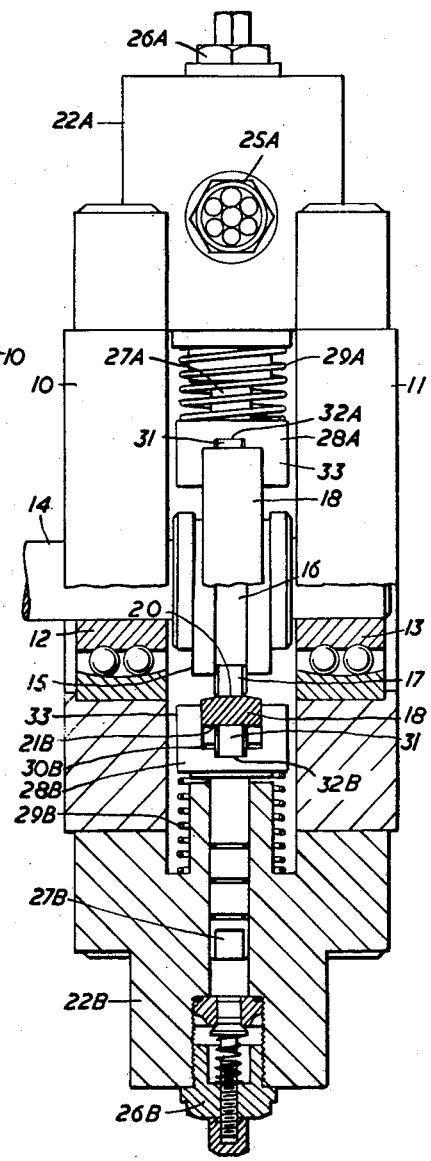
FIGURE 2 is a side elevation of the same pump, also shown partly in section.

Referring to FIGURES 1 and 2, the pump comprises two rigid, rectangular end plates 10 and 11 which accommodate self-tightening double-row ball bearings 12 and 13 respectively, which bearings support a shaft 14. Formed integrally with the shaft between the end plates 10 and 11 is an eccentric 15 provided with a grooved track 16 which receives a plurality of rollers 17. The track 16 is circular about a central axis 19.

Surrounding the eccentric 15 and the ring of rollers 17 is a ring 18. The ring has a circular inner surface 20 and two outwardly-facing flat chordal surfaces 21A and 21B.

Mounted on the top and bottom respectively of the end plates 10 and 11 are two cylinder blocks 22A and 22B. Each cylinder block has a bore 24, an inlet valve assembly 25A or 25B, and an outlet valve assembly 26A or 26B. In each bore 24 there slides a piston, the upper piston being designated 27A and the lower piston 27B. Each piston has an end piece 28A or 28B, and is urged towards the shaft 14 by a spring 29A or 29B.

Each end piece 28A or 28B is formed with a groove 30A or 30B which accommodates three rollers 31, these rollers being interposed between a flat surface 32A or 32B at the base of the groove and the flat surface 21A or 21B, as the case may be, of the ring 18. The sides of the grooves overlap the ring 18, as shown at 33, and serve to maintain the groove bases 32A and 32B in alignment with the length of the flat chordal surfaces 21A and 21B respectively.

The ends of the grooves 30A and 30B are defined by stops 35, the length of each groove between the stops being greater than the sum of the diameters of the three rollers 31 by a distance at least equal to the throw of the eccentric, to permit free rolling of the rollers throughout the full range of relative lateral movement of the ring 18 and the pistons.

In operation, the shaft 14 is rotated about its axis 34 with the consequence that the ring 18 performs an eccentric circular motion. When the shaft has rotated through 180° from the position shown in FIGURE 1, the chordal surfaces 21A and 21B of the eccentric ring will both have risen through a distance equal to twice the throw of the eccentric 15, whereby the upper piston 27A will have performed its volume-reducing stroke in the bore cylinder block 22A, while the lower piston 27B will have performed its volume-increasing stroke in the bore in the cylinder block 22B. When the shaft 14 has rotated through only 90°, however, the ring 18 will have been displaced laterally by a distance equal to the throw of the eccentric, while when the shaft has rotated through 270° there will be an equal lateral displacement in the opposite direction. Consequently, the chordal surfaces 21A and 21B not only move up and down but also oscillate laterally during the rotation of the shaft 14. The rollers 31, by rolling between the chordal surfaces 21A, 21B and the piston and surfaces 32A, 32B, accommodate this relative lateral oscillation between the ring 18 and the pistons 27A, 27B in a virtually friction-free manner.

Figure 3:
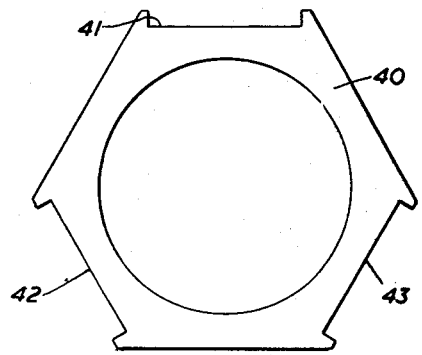
FIGURE 3 is a view of an eccentric ring for a three-cylinder pump.

FIGURE 3 shows the eccentric ring 40 for a three-piston pump, the three pistons being uniformly disposed at 120° angles. In this case there are three flat chordal surfaces 41, 42 and 43, respectively, associated with the three pistons of the pump.

It will be appreciated that two or more rows of rollers could be used in place of the single rows of rollers illustrated. Also, these rollers could be replaced by balls.

What we claim as our invention and desire to secure by Letters Patent is:

1. A machine comprising a rotatable shaft, at least one piston capable of reciprocation towards and away from said shaft, and a driving connection between said shaft and said piston, said driving connection comprising an eccentric on said shaft, said eccentric having a circular periphery the central axis of which is parallel with, but laterally offset from, the axis of rotation of said shaft, a ring surrounding said eccentric, said eccentric being capable of rotation within said ring, said ring having at least one outwardly-facing flat chordal surface, said piston having an inner end piece adjacent said ring, said end piece having flat transverse inner side surfaces and a flat transverse inner base surface together defining an inwardly-facing transverse parallel-sided guide groove parallel to said flat chordal surface, and a plurality of uncaged rollers interposed between and rollable along said flat chordal surface and along said base surface of said groove, said rollers having an axial length substantially equal to the width of said guide groove between said side surfaces of said groove and being restrained in their axial direction by said side surfaces.

2. A machine according to claim 1, in which said chordal surface is terminated by stops, the distance between said stops minus the sum of the diameters of said rollers being at least as great as, and approximately equal to, the throw of the eccentric.

3. A machine according to claim 1, in which said inner end piece of said piston has side walls overlapping said ring and axially spaced from said ring by a small clearance to locate said ring against axial displacement.

References Cited in the file of this patent

UNITED STATES PATENTS

| | | |
|---|---|---|
| 1,190,949 | Philippe | July 11, 1916 |
| 1,787,173 | Samuels | Dec. 30, 1930 |
| 2,006,779 | Terrell | July 2, 1935 |
| 2,324,291 | Dodge | July 13, 1943 |
| 2,340,010 | Miller | Jan. 25, 1944 |
| 2,355,011 | Putnam | Aug. 1, 1944 |
| 2,366,237 | Clausen | Jan. 2, 1945 |
| 2,458,869 | Naylor | Jan. 11, 1949 |

FOREIGN PATENTS

| | | |
|---|---|---|
| 1,027,031 | Germany | Mar. 27, 1958 |